(12) United States Patent
Frenger et al.

(10) Patent No.: US 9,485,704 B2
(45) Date of Patent: Nov. 1, 2016

(54) METHOD AND ARRANGEMENT FOR HANDLING HANDOVER RELATED PARAMETERS IN A MOBILE COMMUNICATIONS NETWORK

(75) Inventors: Pal Frenger, Linkoping (SE); Fredrik Gunnarsson, Linkoping (SE); Johan Moe, Mantorp (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1514 days.

(21) Appl. No.: 12/935,575

(22) PCT Filed: Apr. 3, 2008

(86) PCT No.: PCT/SE2008/050385
§ 371 (c)(1),
(2), (4) Date: Sep. 29, 2010

(87) PCT Pub. No.: WO2009/123512
PCT Pub. Date: Oct. 8, 2009

(65) Prior Publication Data
US 2011/0026492 A1    Feb. 3, 2011

(51) Int. Cl.
*H04W 4/00* (2009.01)
*H04W 36/34* (2009.01)
*H04W 36/00* (2009.01)
*H04W 36/08* (2009.01)

(52) U.S. Cl.
CPC ......... *H04W 36/34* (2013.01); *H04W 36/0083* (2013.01); *H04W 36/08* (2013.01)

(58) Field of Classification Search
CPC .................... H04W 36/0055; H04W 36/0011; H04W 88/06; H04W 36/08; H04W 80/04
USPC ....... 370/331, 332, 335, 324, 350, 310, 337, 370/329; 455/436, 552, 69
See application file for complete search history.

(56) References Cited

U.S. PATENT DOCUMENTS

| | | | | |
|---|---|---|---|---|
| 5,379,446 | A | * | 1/1995 | Murase ................. H04W 36/30 455/444 |
| 5,862,489 | A | * | 1/1999 | Aalto ............................ 455/522 |
| 6,445,917 | B1 | * | 9/2002 | Bark ..................... H04W 24/00 370/331 |

(Continued)

OTHER PUBLICATIONS

3rd Generation Partnership Project. "Reply LS on Self Tuning of Cell Reselection/Handover Parameters for Load Balancing Purpose." 3GPP TSG RAN WG3 Meeting #58, R3-072444, Jeju Island, Korea, Nov. 5-9, 2007.

(Continued)

*Primary Examiner* — Chi H Pham
*Assistant Examiner* — Alexander O Boakye
(74) *Attorney, Agent, or Firm* — Coats & Bennett, PLLC

(57) ABSTRACT

The invention relates to methods and arrangements for handling handover-related parameters. A radio base station of a mobile communications network is arranged to serve at least a first cell, and to make handover decisions based on handover-related parameters. The radio base station comprises means for receiving handover related feedback from a radio base station serving a second cell after handover of a UE from said first cell to said second cell; means for using the handover related feedback received from the base station serving said second cell to adjust the handover-related parameters; and further by means for sending handover related feedback to a radio base station serving a second or another cell after handover of a UE to said first cell from said second or another cell.

35 Claims, 12 Drawing Sheets

(56) References Cited

U.S. PATENT DOCUMENTS

| | | | |
|---|---|---|---|
| 6,968,190 | B1 | 11/2005 | Suumaki |
| 7,024,163 | B1 * | 4/2006 | Barratt et al. .................. 455/69 |
| 7,310,499 | B2 * | 12/2007 | Magnusson et al. ........... 455/69 |
| 8,045,996 | B2 * | 10/2011 | Brunner et al. ........... 455/456.1 |
| 2004/0266434 | A1 | 12/2004 | Lehtinen et al. |
| 2006/0148480 | A1 | 7/2006 | Thorson et al. |
| 2007/0191044 | A1 * | 8/2007 | Kostic et al. ................. 455/522 |
| 2007/0238480 | A1 * | 10/2007 | Lin et al. ...................... 455/522 |
| 2007/0275722 | A1 * | 11/2007 | Thorson ............ H04W 36/0055 455/436 |

OTHER PUBLICATIONS

3rd Generation Partnership Project. "Reply LS (to R1-073885) on Self-Tuning of Cell Reselection/Handover Parameters for Load Balancing Purpose." 3GPP TSG RAN WG2 Meeting#60bis, R2-080501, Sevilla, Spain, Jan. 10-14, 2008.

Nec, "Cell Reselection Parameters Tuning", 3GPP TSG-RAN WG2#61bis, Mar. 31-Apr. 4, 2008, Shenzen, China, R2-081914.

Orange et al., "Self-optimization use case: self-tuning of handover parameters", 3GPP TSG-RAN WG3 #55bis, Mar. 27-30, 2007, Malta, Tdoc R3-070562.

Huawei, "RLF Analysis", 3GPP TSG RAN WG2 Meeting #61bis, Mar. 31-Apr. 3, 2008, Shenzen, China, R2-081697.

Huawei, "Mobility Robustness Optimization Solution", 3GPP TSG RAN WG3 Meeting #59, Feb. 11-15, 2008, Sorrento, Italy, R3-080358.

T-Mobile, "Information to be included at Hand Over request messages, to avoid Ping-Pong Hand Over", 3GPP TSG-RAN WG3 Meeting #57, Aug. 20-24, 2007, Athens, Greece, R3-071598.

Nokia, et al., "Relevant Information for Handover," 3GPP TSG-RAN WG2 Meeting #57bis, Agenda item: 5.10.1, St. Julian's, Malta, Mar. 26, 2007, R2-071232, R2-070458, p. 1.

Alcatel-Lucent, "Handover Self-optimization by eNB measurements," 3GPP TSG RAN3#57 bis, Agenda Item: 7.2.2.b, Sophia Antipolis, France, Oct. 8, 2007, R3-071869, pp. 1-4.

Nokia, "Fast and Reliable Handover," 3GPP TSG-RAN WG2 Meeting #57bis, Agenda item: 5.10.1, St. Julian's, Malta, Mar. 26, 2007, R2-071239, pp. 1-3.

Brunner, C., et al., "Inter-System Handover Parameter Optimization," IEEE 64th Vehicular Technology Conference, VTC-2006 Fall, Montreal, Quebec, Sep. 25, 2006, pp. 1-6.

3rd Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 v.82.0, Sep. 2007, pp. 1-109.

* cited by examiner

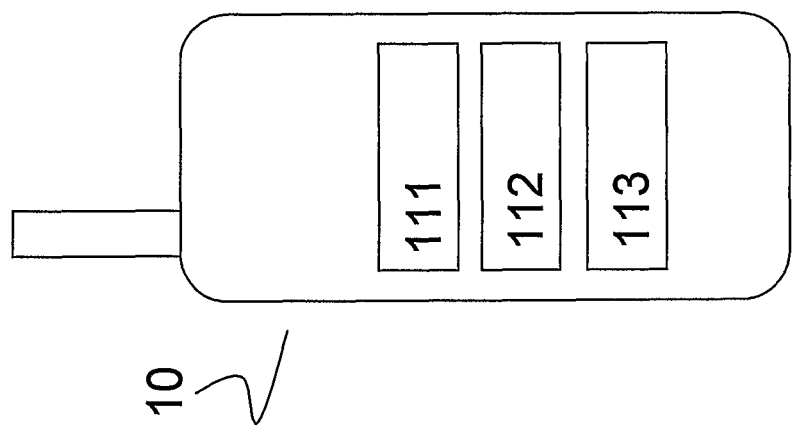

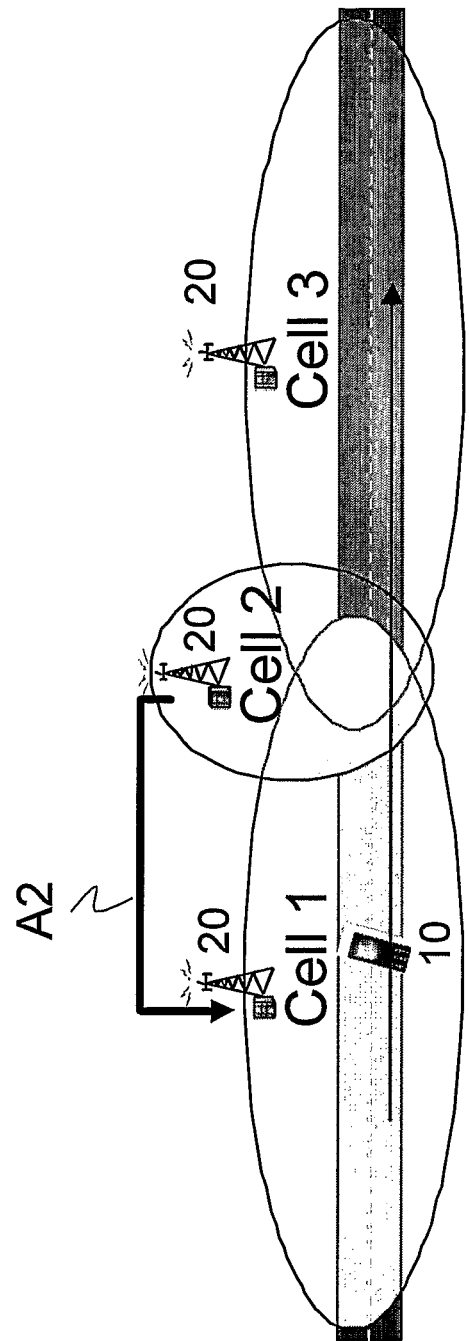

METHOD AND ARRANGEMENT FOR HANDLING HANDOVER RELATED PARAMETERS IN A MOBILE COMMUNICATIONS NETWORK

TECHNICAL FIELD

The present invention relates to methods and arrangements in a telecommunication system, in particular to methods and arrangements for handling handover related parameters.

BACKGROUND

A key feature in most cellular communication systems is the ability to handoff an ongoing communication service from one cell to another. Handover (HO) methods and algorithms can be classified in many different ways, e.g. as soft handover where a mobile station is connected to several base stations, softer handover where a mobile station is connected to several cells or sectors belonging to the same base station, and hard handover where the mobile station disconnects from the old base station before connecting to the new base station. Methods for handover decisions can be also be classified as being network controlled HO (NCHO), in which the mobile is passive, mobile assisted HO (MAHO), in which the mobile e.g. measures the strengths of received signals and reports the measured values to the network where a handover decision is then taken, and mobile controlled HO (MCHO), in which the mobile e.g. measures the strengths of received signals and makes a handover decision based on the measured values.

One important class of handover algorithms is the radio-signal-measurement (RSM) triggered schemes. Most RSM triggered handover schemes perform averaging or low-pass filtering of measured data. Furthermore, the handover decision algorithms belonging to this class typically include, at least, a hysteresis margin and a time-to-trigger threshold that the filtered data samples are compared against during the handover decision process.

The 3rd Generation Partnership Project (3GPP) is a collaboration agreement that brings together a number of telecommunications standards bodies. Within the 3GPP workgroups a new system concept denoted Long Term Evolution (LTE) and System Architecture Evolution (SAE) are being standardized. The architecture of the 3GPP LTE/SAE system (denoted LTE here after), which is schematically illustrated in FIG. 1, is flat compared to e.g. GSM (Global System for Mobile communications) and WCDMA (Wideband Code Division Multiple Access) based systems. FIG. 1 shows that the LTE radio base stations 100a, 100b, 100c (denoted eNodeBs, or eNBs, in 3GPP terminology) are directly connected to the core network nodes 101a, 101b MME/S-GWs (mobility management entity/serving gateway) via the S1 interfaces 102a, 102b, 102c, 102d. The S1 interface supports a many-to-many relation between MMEs/Serving Gateways and eNBs. There is no central radio network controller in the Evolved UMTS Terrestrial Radio Access Network (E-UTRAN). Instead the eNBs are connected to each other via the direct logical X2 interfaces 103a, 103b, 103c.

The handover method that will be used in the 3GPP LTE/SAE system is RSM triggered and the mobile assisted (MAHO) hard handover. In LTE the mobile station, also referred to as the user equipment (UE), performs measurements of the downlink and the network makes the handover decisions. Compared to legacy cellular systems, as stated above, the LTE system does not have any central radio network controller (like the BSC in GSM and the RNC in WCDMA) where the handover algorithm is located. Instead the handover decisions in LTE will be performed in the base stations (referred to as eNBs in LTE). The decision to initiate a handover from a source cell to a target cell will be made in the source cell by the radio base station.

The UEs are configured by a radio resource control (RRC) entity in the source cell to perform measurements on handover candidate cells and to report these measurements to the source eNB during active mode. The details of how these measurements are configured are not yet decided in 3GPP. The handover measurement configuration will either be broadcasted or sent as dedicated messages to each individual UE. Both options will probably be possible in the finalized LTE standard.

The RRC messages for configuration of handover measurements as well as the corresponding UE measurements will be standardized and will not be subject to vendor specific interpretation or implementation. A typical configuration is that the UE will start to report periodically to the radio base station of a handover candidate cell once the filtered reference symbol received power (RSRP) of the candidate has reached a certain level compared to the RSRP level of the source cell during a configurable time. Once the UE starts reporting it could continue to obtain measurements and continuously send updated reports. Alternatively, the UE could perform measurements only prior to reporting and then send a single report stating that prerequisites for a handover are fulfilled.

FIG. 2 shows a diagram that illustrates a conventional handover procedure from a source cell to a target cell in LTE. The vertical axis shows signal level and the horizontal axis shows time. The UE is configured by the source cell RRC to perform measurements on the source cell RSRP (RSRP1) and on candidate cells RSRP, i.e. possible target cells to which handover might be likely to occur. It should be noted that only one candidate cell measurement RSRP2 is shown. The measurement command contains information about how the UE shall process, e.g. by filtering or averaging, the measured data and when the UE shall start to report measurements to the source eNB. In this example the UE is configured to start to perform periodic reporting once the candidate RSRP2 value is larger than the source cell RSRP1 plus a hysteresis margin 21 during a certain time period 22 (time-to-trigger, or TTT). This occurs at a time denoted Ta. The purpose of the hysteresis margin is to prevent that action is taken prematurely. The hysteresis margin is defined as a predefined minimum difference between measurement values. In the example in FIG. 2 the hysteresis margin 21 defines a minimum difference between RSRP1 and RSRP2. After the source eNB1 has received one or several reports from the UE a decision to initiate handover to the target eNB2 is taken by eNB1. The eNB1 sends a handover request to eNB2 at a time denoted Tb, and when the handover is prepared the eNB1 sends at a time denoted Tc a handover command instructing the UE to perform the handover to eNB2.

The handover decision process in the source eNB typically consists of processing, e.g. by means of low-pass filtering, the UE measurements and by comparing the processed values with a hysteresis margin and with a time-to-trigger threshold. The eNB may use different handover related parameters when deciding on handovers to different target cells. Furthermore the eNB may classify UEs based on the speed or their handover history and the eNB may use different parameters for the handover decision process for different UE classes. In this way the eNB may e.g. use a particular set of handover related parameters for UEs that are classified as high speed UEs. For high speed UEs the time-to-trigger might need to be reduced compared to low speed UEs. Alternatively, the eNB in a first cell may know that UEs that enter from a second cell will almost always perform handover to a third cell. To ensure that such UEs, that might be moving in a train or along a road, end up in the correct target cell the hysteresis margin to the desired target cell may be reduced for this particular class of UEs.

The fact that the handover algorithm in LTE is performed by the eNB, and not in a central node controlling several base stations, as e.g. in an RNC in the WCDMA based UMTS, results in several problems that need to be addressed.

To begin with, there is no simple way to ensure that handovers within a geographical area are performed based on the same algorithm. This becomes particularly difficult in a multi vendor scenario since it is likely that different eNB vendors will implement different proprietary handover algorithms. Consequently, the criteria for when to perform a handover between two cells of the same type may be completely different depending on which cell that acts as source cell. Furthermore, within an area the criteria for when to perform a handover from an LTE system to a system having a different radio access technology (e.g. WCDMA) may also differ depending on which cell that currently is serving a particular UE.

Another problem is related to the planning and optimization of the handover related parameters that control the behaviour of the handover algorithm(s). In case of network planning the operator may be faced with the difficult task of setting a large number of handover related parameters corresponding to the particular algorithm implementations of different vendors. Each parameter will have its own definition and impact on the handover behaviour.

According to the 3GPP the handover preparation phase is initiated when the source eNodeB sends a HANDOVER REQUEST (HO_REQUEST) message to a target eNB via the X2 or the S1 interface. It has been proposed but not agreed in 3GPP to add an optional information element denoted HO_RRM_CONTAINER into the HO_REQUEST message. The content of this container is proposed not to be subject to standardization and hence an eNB vendor may put proprietary information into it. In case both the source and the target eNB are manufactured by the same vendor this optional container can be useful for support of more advanced handover methods. To have some consistency in the handover behaviour in the network the operator may then decide to only employ eNBs from one vendor in a certain area. However also this might be problematic, since in different types of base stations (macro, micro, pico) it can make sense to implement different handover algorithms. Macro-cells, micro-cells, and pico-cells, respectively, refer to cells of different sizes, whereby a macro-cell, which is a normal cell, is the largest, and a pico-cell is the smallest. For example, a pico-cell may not have to handle handover of high speed UEs.

As mentioned above, existing solutions for handover parameter optimization rely on the handover being performed in a central controller node. This is not applicable for LTE. Instead the handover decisions are distributed to the radio base station where different vendors may implement their own proprietary algorithms.

The complexity of the problem of manually optimizing handover parameters in a multi-vendor scenario is large. Handover parameter auto-tuning, or auto-adjusting, methods are complicated by the fact that they require extensive efforts regarding standardizing algorithms, eNB measurements, and parameters related to handover.

Furthermore, handover decisions are frequently made based on inadequate, and often out-of-date, data. This may lead to handovers being executed too fast, too slow or sometimes unnecessarily. This may hence lead to a non-optimal use of radio resources.

The work in 3GPP is focused on adding information in the HO_REQUEST message sent from the source to the target eNB. However since the handover decision by then is already taken by the eNB in the source cell, the added information is of little use when it comes to auto-tuning of handover related parameters in the source cell.

Thus, optimization of handover related parameters in an architecture in which the handover decisions are made by the radio base station, as e.g. in LTE, presents a problem to which the prior art does not offer satisfactory solutions.

SUMMARY

It is an object of the present invention to overcome or at least alleviate some or all of the above-mentioned drawbacks of the prior art, and to achieve an improved optimization of the handover-related parameters.

These and other objects, which will be apparent from the following description, are achieved completely or partially by means of a radio base station, methods in a radio base station, and a user equipment according to the appended independent claims. Preferred embodiments are defined in the dependent claims.

The invention relates in a first aspect to a radio base station of a mobile communications network, the radio base station is arranged to serve at least a first cell, and to make handover decisions based on handover-related parameters. The radio base station comprises means for receiving handover related feedback from a radio base station serving a second cell after handover of a UE from said first cell to said second cell; and means for using the handover related feedback received from the base station serving said second cell to adjust the handover-related parameters. The means for receiving handover related feedback from a radio base station serving the second cell and the means for using said feedback that have been received from the base station serving the second or another cell, are required when the first cell is a source cell and the second cell is a target cell in connection with a handover of a user equipment from the source cell to the target cell.

Furthermore, the radio base station comprises means for sending handover related feedback to a radio base station serving a second or another cell after handover of a UE to said first cell from said second or another cell. Thus, these means are required when the first cell is a target cell and the second or another cell is a source cell in connection with a handover of a user equipment from the source cell to the target cell.

The means utilised according to this first aspect, such as antenna and radio equipment, are all standard base station components well known to a person skilled in the art. Software run on e.g. a processor in the radio base station could be used for logical operations, such as how to use post-handover measurements for adjusting handover-related parameters.

According to a specific embodiment of the invention, said handover related feedback comprises post-handover measurements performed by a user equipment after handover from said first cell to said second cell or from said second or another cell to the first cell. The radio base station according to this embodiment further comprises means for receiving post-handover measurements from a user equipment in said first cell, said measurements performed by the user equipment after handover to said first cell from a second or another cell; and means for sending said post-handover measurements to a radio base station serving said second or another cell.

The radio base station serving the first cell may further comprise means for instructing a user equipment in the first cell to perform post-handover measurements after being handed over from the first cell to the second cell, and forward the post-handover measurements to radio base station in the second cell.

Furthermore, the radio base station serving the first cell may comprise means for sending instructions to a radio base station serving the second cell. The instructions may state that the radio base station in the second cell shall send a request to a user equipment in the second cell. This request is for post-handover measurements after handover of the user equipment from the first cell to the second cell.

According to yet another specific embodiment, the handover-related feedback comprises a report in case a user equipment is handed over from the second cell to a third cell within a predefined time period after a handover of the user equipment from the first cell to the second cell. Thus, the radio base station serving a first cell may also comprise means for sending a request to a radio base station serving a second cell to return such report. The radio base station in the first cell may also comprise means for receiving the report from the radio base station serving the second cell. The radio base station serving the first cell may also comprise means for using the report to adjust handover-related parameters.

In a second aspect, the invention relates to a method in a radio base station of handling handover-related parameters in a mobile communications network, said radio base station serving a first cell and arranged to make handover decisions based on handover-related parameters. The method comprises the steps of receiving handover-related feedback from a radio base station serving a second cell, said handover-related feedback performed by the user equipment after handover from the first cell to the second cell; and using said received handover-related feedback to adjust the handover-related parameters.

According to this second aspect the method may be used in a radio base station located in a cell that acts as a source cell in connection with a handover of a user equipment from a source cell to a target cell.

In a specific embodiment, said handover related feedback may comprise post-handover measurements performed by a user equipment in said second cell after handover from said first cell to said second cell.

According to a third aspect, the invention relates to a method in a radio base station of handling handover-related parameters in a mobile communications network, said radio base station serving a second cell. The method comprises the step of sending handover-related feedback to a radio base station serving a first cell after handover of a UE from the first cell to said second cell for adjustment of handover-related parameters used as basis for handover decisions in said first cell. Thus, according to this third aspect the method may be used in a radio base station located in a cell that acts as a target cell in connection with a handover of a user equipment from a source cell to a target cell.

According to a specific embodiment, said handover related feedback comprises post-handover measurements, whereby according to this embodiment, the method furthermore comprises the steps of receiving post-handover measurements from a user equipment, said post-handover measurements performed by the user equipment after handover from a first cell to said second cell; and sending said post-handover measurements to a radio base station serving said first cell for adjustment of handover-related parameters used as basis for handover decisions in said first cell.

In a fourth aspect of the invention, it relates to a user equipment arranged to communicate with a radio base station serving a second cell. The user equipment comprises means for performing post-handover measurements after handover from a first cell to the second cell; and means for sending said post-handover measurements to the radio base station serving said second cell, to be forwarded to a radio base station serving said first cell for adjustment of handover-related parameters to be used as basis for handover decision in said first cell.

The means utilised according to this fourth aspect, such as necessary antenna and radio equipment, as well as data processing equipment, are all standard user equipment components well known to a person skilled in the art.

Thus the present invention aims to overcomes the problem of handover decisions being made based on inadequate data by making it possible to utilise handover related feedback, for example post-handover measurements from a UE, to adjust handover related parameters.

An advantage with the present invention is that the radio base station according to embodiments of the present invention can be used regardless of the vendor, in a multi-vendor network.

Further objectives, features, aspects and advantages of the present invention will appear from the following detailed disclosure, from the attached dependent claims as well as from the drawings.

BRIEF DESCRIPTION OF THE DRAWINGS

Exemplifying embodiments of the invention will now be described in more detail with reference to the accompanying schematic drawings.

FIG. 10 schematically illustrates a user equipment for which embodiments of the invention can be used.

FIG. 11 illustrates an example scenario in which a UE is handed over from a first cell to a third cell via a second cell.

DETAILED DESCRIPTION

In the following description, specific details are set forth, such as particular architectures and sequences of steps in order to provide a thorough understanding of the present invention. However, it is apparent to a person skilled in the art that the present invention may be practised in other embodiments that may depart from these specific details.

Moreover, it is apparent that the described functions may be implemented using software functioning in conjunction with programmed microprocessors or general purpose computers, and/or using application-specific integrated circuits (ASICs). Where the invention is described in the form of a method, the invention may also be embodied in a computer program product, as well as in a system comprising a computer processor and a memory, wherein the memory is encoded with one or more programs that may perform the described functions.

Figure 1:
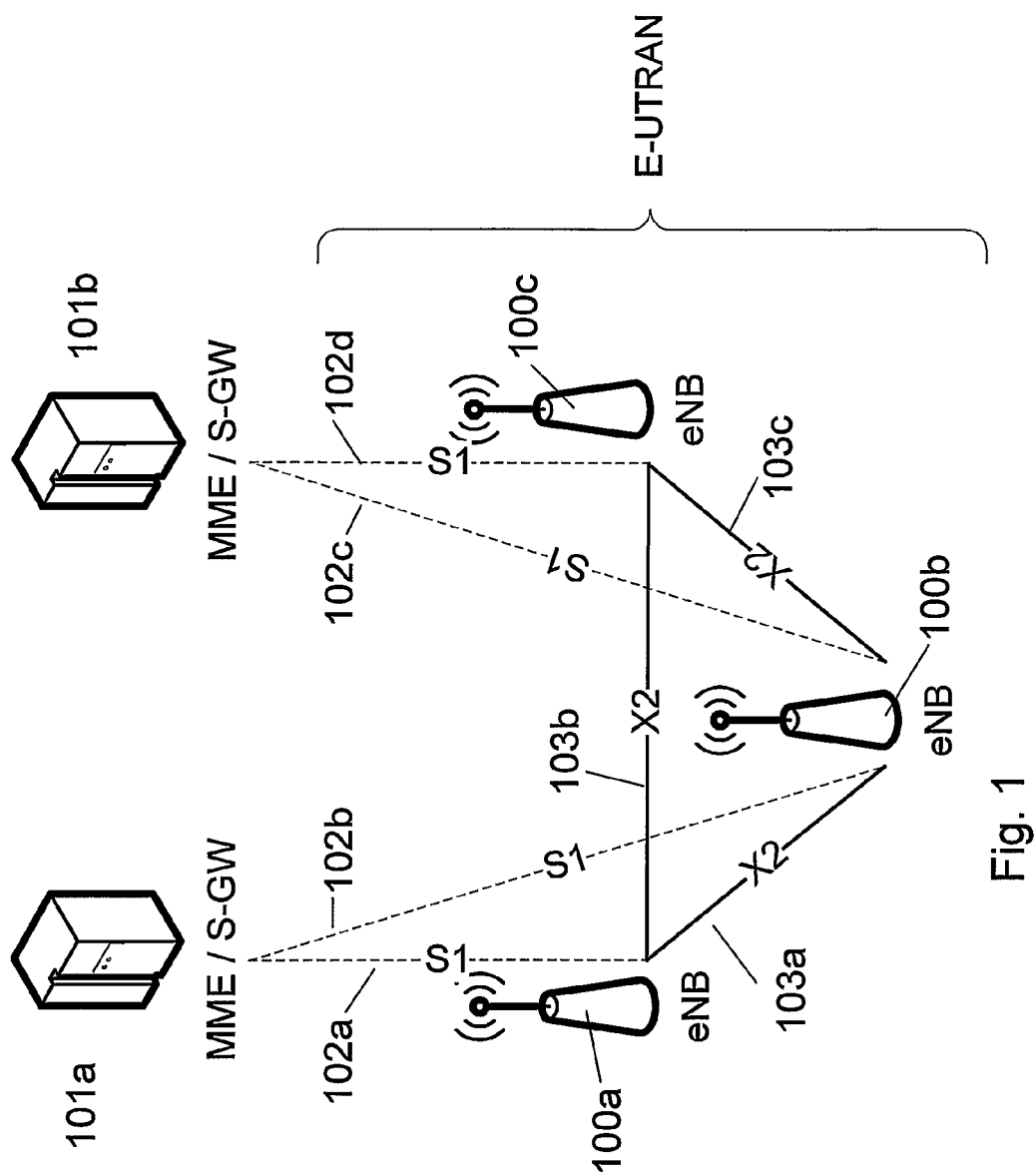
FIG. 1 schematically illustrates the 3GPP LTE/SAE overall architecture.
Figure 2:
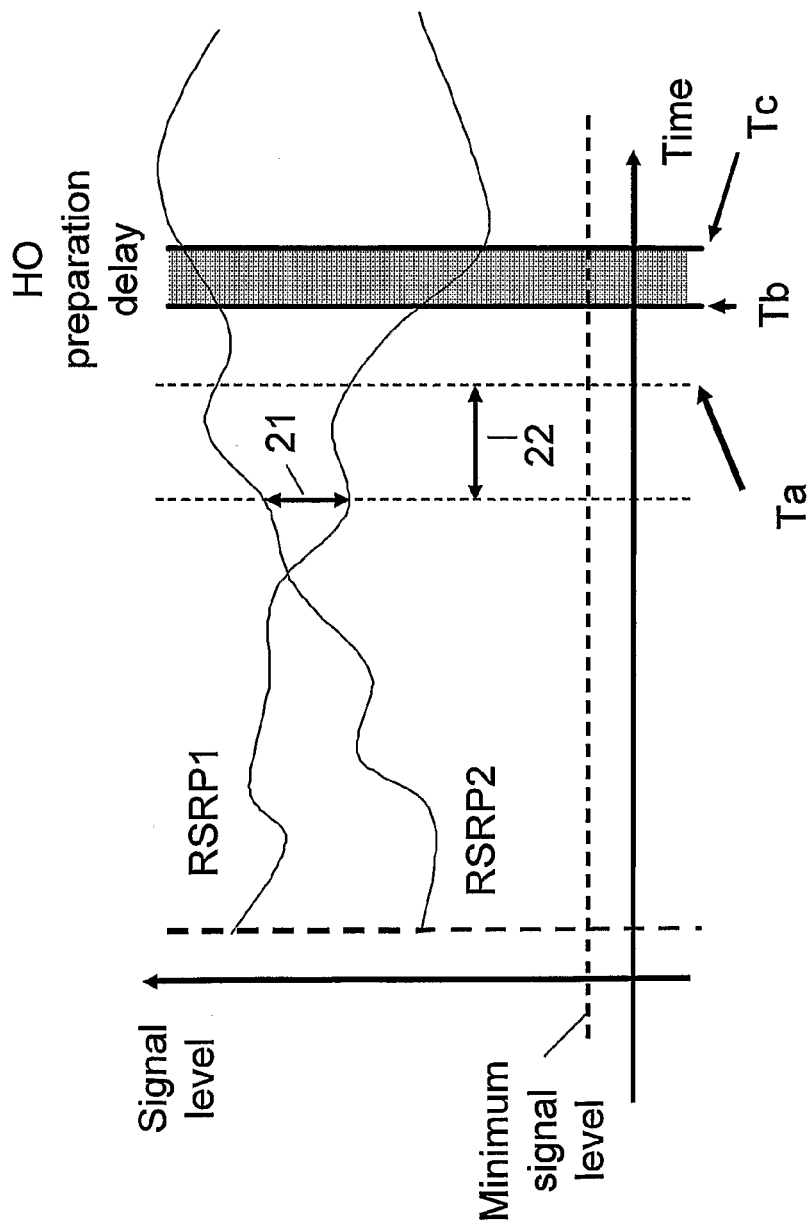
FIG. 2 shows a diagram that schematically illustrates conventional mobile assisted handover in LTE.
Figure 3:
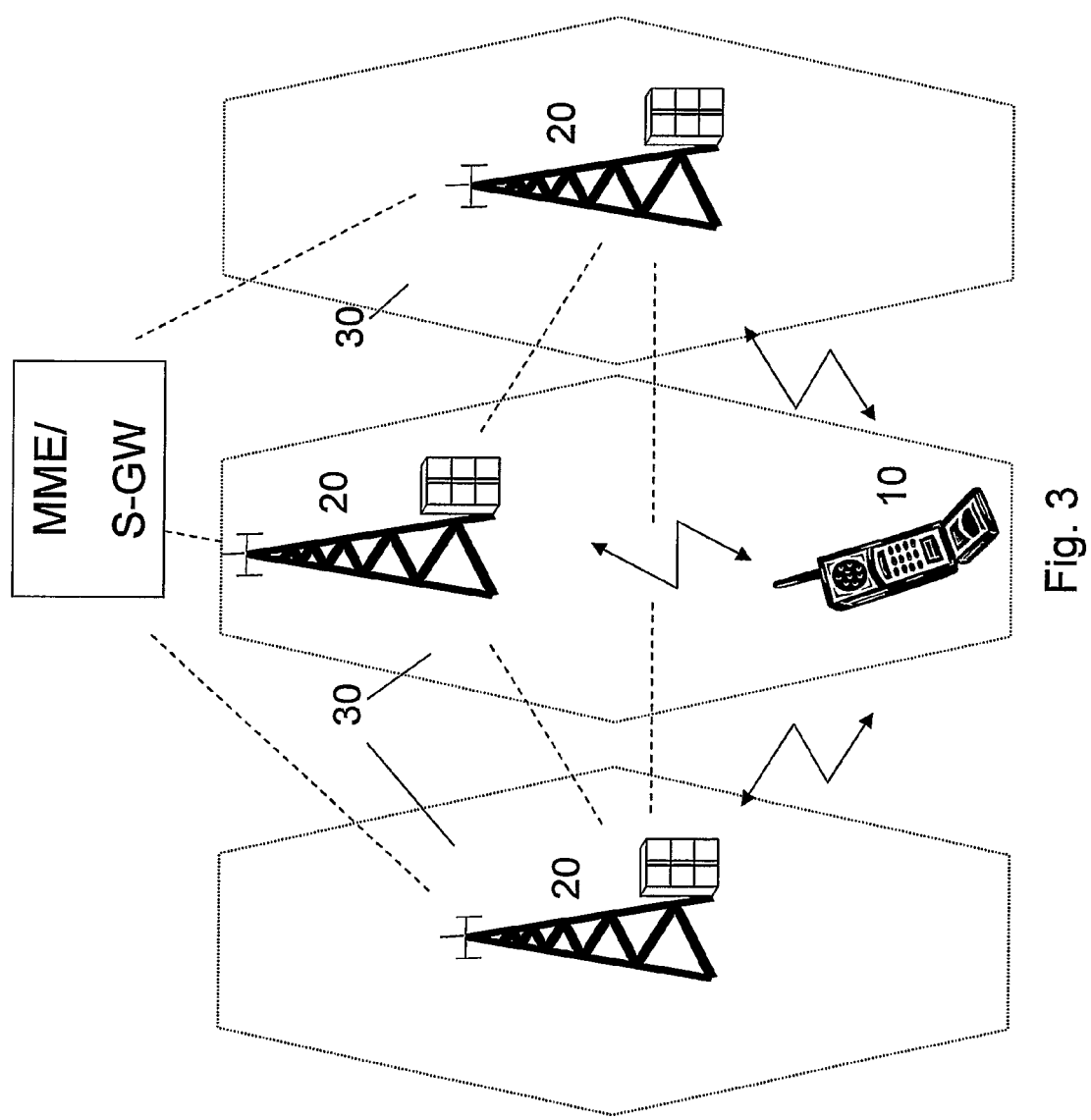
FIG. 3 schematically illustrates the general architecture in which embodiments of the invention can be used.

FIG. 3 shows the general architecture in which the invention may be used. A mobile station 10, referred to as a user equipment (UE), is located within the coverage of a mobile communications network. The UE 10 communicates with base stations 20, also referred to as E-UTRAN NodeBs (eNBs) in the case of LTE, which provides wireless network coverage for a particular coverage area commonly referred to as a cell 30. The UE 10 may be handed over between cells 30, e.g. when the user of a UE 10 is moving in a vehicle. In the case of handover the cell from which the UE 10 is handed over is referred to as the source cell, whereas the cell to which the UE 10 is handed over is referred to as the target cell. The eNBs are interconnected, and are also connected to the EPC (Evolved Packet Core), and more specifically to the MME (Mobility Management Entity) and to the Serving Gateway (S-GW). Radio Resource Control (RRC) terminates in eNB, and measurement configuration is done via the RRC, which resides in the eNB.

According to the invention, handover related feedback such as measurements performed by a user equipment in a target cell after handover to the target cell from a source cell, are used to adjust handover-related parameters in the source cell. This is accomplished by the user equipment forwarding post-handover measurements, via the radio base station in the target cell, to the radio base station of the source cell, which uses the received post-handover measurements to adjust the handover-related parameters. Thereby, the handover decisions made by the radio base station serving the source cell can be based on relevant and up-to-date data, which minimises the risk of handovers being performed unnecessarily, too slow, or too fast.

To be able to achieve this, the radio base station, also referred to as the eNodeB, will have to adaptively adjust the handover parameters it uses, e.g. the hysteresis margin and the time-to-trigger threshold common to RSM triggered handover methods. However, it is equally applicable to other parameters used in a RSM triggered MAHO scheme. For example, a signal derivative parameter could be used as a basis to make handover decisions. In such a case a UE could be configured to perform periodic measurement reporting once the changes between measurement samples have reached a predetermined level. Furthermore, the sampling rate, i.e. the number of individual value measurements made by a UE during a certain time period, could be varied. Measurements could be obtained at regular or irregular intervals.

According to an exemplary embodiment of the invention the source RRC entity is allowed to configure a UE to perform additional measurements for a configurable time after the handover to a target cell is performed. Thereafter, the target forwards these additional measurements back to the source cell, and these post-handover measurements are then used for auto-tuning of handover related parameters.

Figure 4:
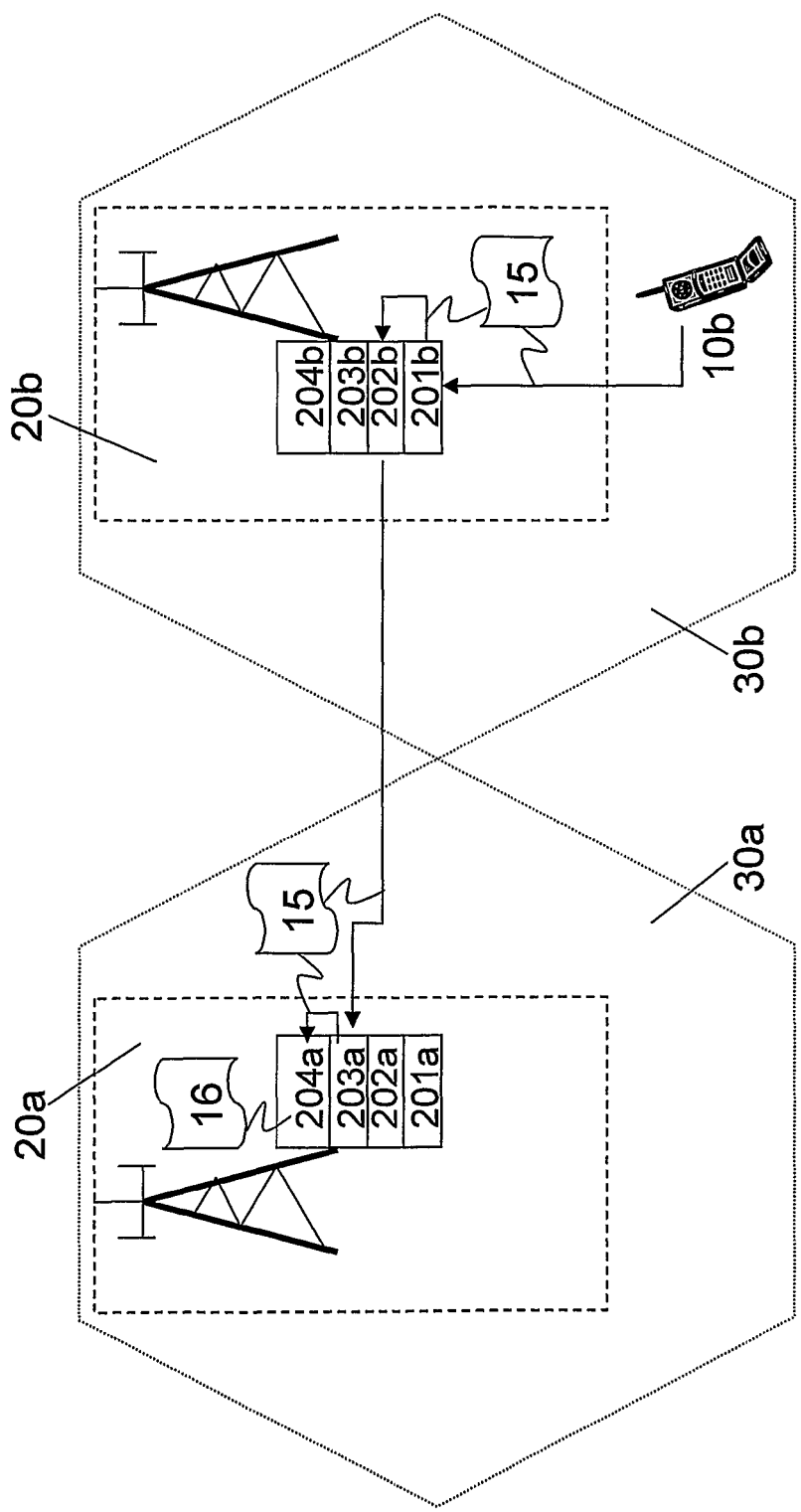
FIG. 4 schematically illustrates an embodiment of the present invention.

FIG. 4 illustrates an embodiment of the invention. FIG. 4 shows a first radio base station 20a and a second radio base station 20b. Both radio base stations 20a and 20b are arranged to serve at least one cell, and to make handover decisions based on handover-related parameters. Such handover-related parameters may comprise a handover time-to-trigger and/or a handover hysteresis margin. In the example that is illustrated in FIG. 4, the first radio base station 20a serves a first cell 30a, and the second radio base station 20b serves a second cell 30b. A UE 10b has performed handover from the first cell 30a to the second cell 30b. This means that the first cell 30a is the source cell, whereas the second cell 30b is the target cell for this specific handover. The second base station 20b comprises means 201b for receiving post-handover measurements 15 from the UE 10b. The measurements may comprise received signal power measurements. Moreover, the second radio base station 20b comprises means 202b for sending the post-handover measurements 15 to the first base station 20a. Accordingly, the first radio base station 20a comprises means 203a for receiving the post-handover measurements 15 and means 204a for adjusting handover-related parameters 16, such as handover time-to-trigger and/or handover hysteresis margin, based on the received post-handover measurements 15.

Figure 5:
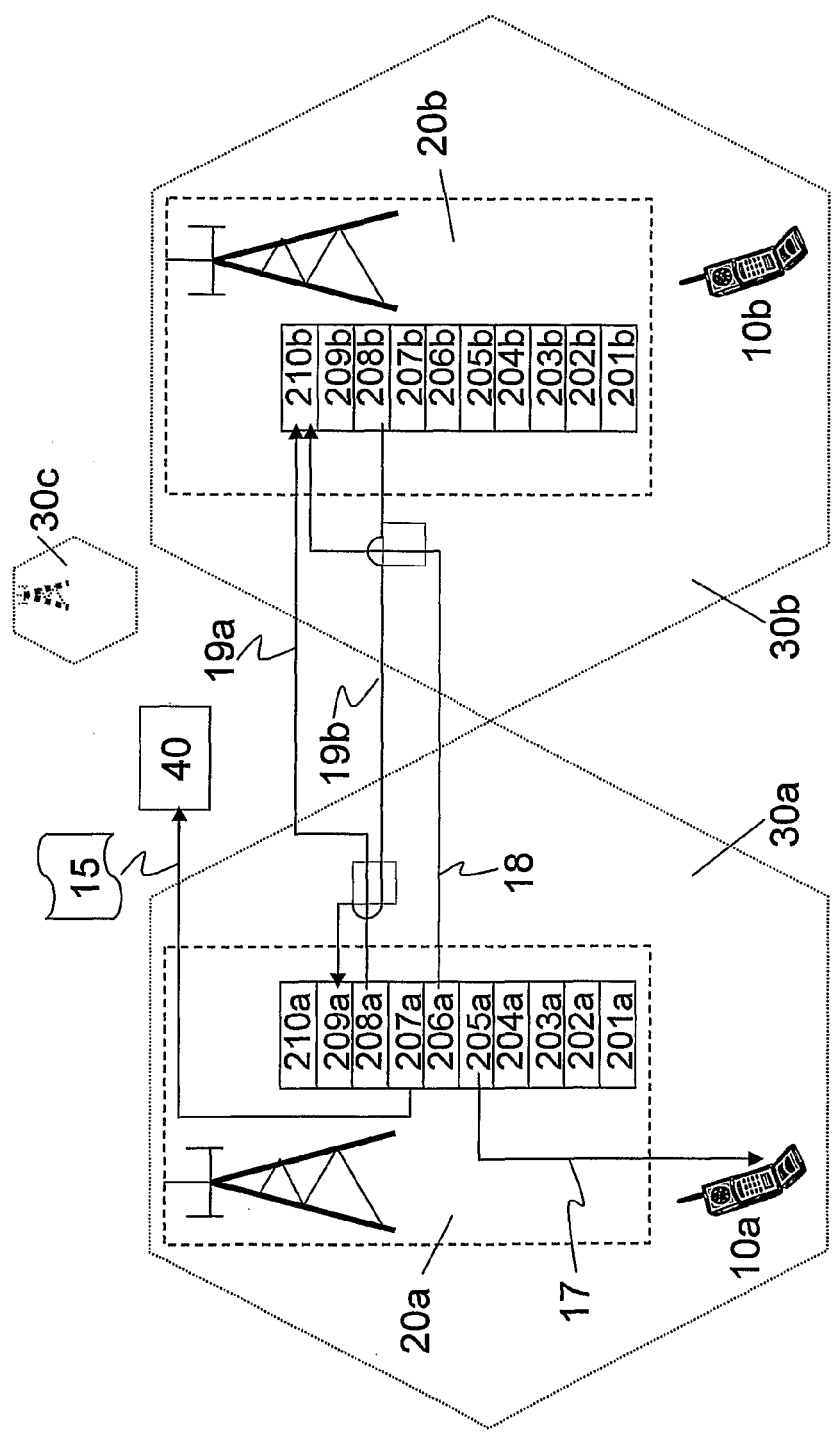
FIG. 5 schematically illustrates another embodiment of the present invention.

Turning now to FIG. 5 showing further embodiments of the present invention. FIG. 5 discloses the elements of FIG. 4. Additionally, each radio base station 20a and 20b comprises means 205a and 205b, respectively, for sending to UEs 10 located in the respective cell, instructions to perform post-handover measurements after handover to another cell, and to forward the measurements to the radio base station 20 that serves that cell. The arrow denoted 17 in FIG. 5 indicates that the first radio base station 20a in this example comprises means 205a for instructing a UE 10a to perform post-handover measurements after handover of the UE 10a from the first cell 30a to the second cell 30b or another cell. The UE 10a is also instructed to forward the measurements to the radio base station 20 serving the cell to which the UE 10a is handed over. For instance, if the second cell 30b is the target cell, then the UE 10a is instructed to perform post-handover measurements in the second cell 30b and forward those measurements to the second radio base station 20b. As described above, the second radio base station 20b can then by the means denoted 202b send the measurements back to the first radio base station 20a, which serves the source cell in this case. The instructions sent from a radio base station 20 to a UE 10 by using the means denoted 205 may also comprise a request for the post-handover measurements to be performed during a certain time period, which may be configured by the radio base station 20.

A radio base station 20 in a source cell comprises means 206 for sending instructions to a radio base station 20 in a target cell. The instructions may tell the radio base station 20 in the target cell to send a request for post-handover measurements to a UE 10 that has been handed over from the source cell to the target cell, or to return a report in case a user equipment is handed over from said second cell to a third cell within a predefined time period after a handover of the user equipment from said first cell to said second cell.

The arrow denoted 18 in FIG. 5 indicates that the first radio base station 20a, which serves the source cell for the UE 10b, uses means 206a to send such instructions to the second radio base station 20b, which serves the target cell for the UE 10b. The second radio base station 20b comprises means 210b that may be used to receive the instructions. Hence, the second radio base station 20b is for example instructed to send a request for post-handover measurements to the UE 10b. The second radio base station 20b may then use means 205b to send the request to the UE 10b.

In an embodiment of the invention the RRC entity in the source cell configures the UE to perform post-handover measurements after the handover is completed and to report these measurements to the radio base station in the target cell. These measurements may be recognized by the radio base station in the target cell to be directed to the radio base station in the source cell by a specific measurement identity provided together with the measurement from the UE to the radio base station in the target cell. Upon receiving measurements for the UE with this specific measurement identity the radio base station in the target cell forwards these measurements to the radio base station in the source cell.

In order to further improve the overall handover decision process, it may also be possible to adjust handover-related parameters in other nodes than the radio base stations 20. Such nodes, which are here referred to as handover-related parameter auto-tuning nodes, may be arranged to use handover related feedback such as post-handover measurements to auto-tune, or auto-adjust, handover-related parameters. FIG. 5 illustrates how the first radio base station 20a comprises means 207a for sending post-handover measurements 15 to a handover-related parameter auto-tuning node 40. In this example the measurements have been performed by the UE 10b in cell 30b, and then forwarded to the second radio base station 20b, which have sent the measurements to the first radio base station 20b by using means 202b as described above.

Figure 6:
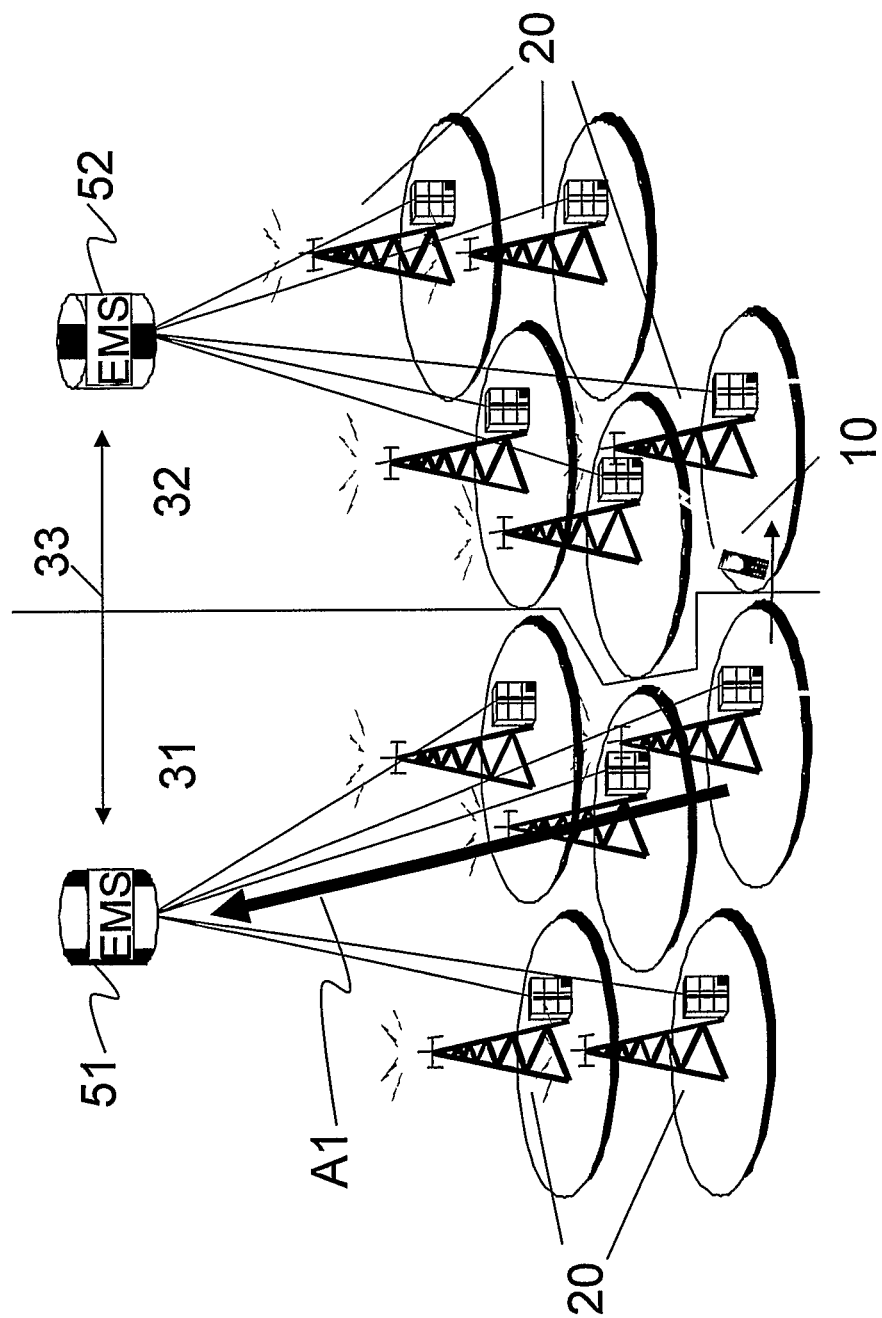
FIG. 6 schematically illustrates a network with eNBs and EMS from two different vendors.

Thus, the actual handover parameter auto-tuning algorithm may apart from being executed in the eNBs, also be executed in a handover-related parameter auto-tuning node, which may be a central element management system (EMS) node, or an operation and support system (OSS) node, or a similar type of centralised node. Since each vendor typically provides the operator with its own EMS node an operator typically has several EMS nodes in the system. Consequently, in areas where two eNBs from different vendors are neighbours there are two EMS nodes involved in the auto-tuning of handover parameters. By performing post-handover measurements and sending these measurements back to the source eNB, via the S1 or X2 interface in the case of LTE, this information can be further forwarded up to the EMS node of the source eNB for additional processing, see FIG. 6 in which eNBs 20 and EMS nodes 51, 52 from two different vendors 31, 32 are shown schematically. Arrow A1 in FIG. 9 denotes that post-handover measurements are sent from an eNB 20 to an EMS node 51. Alternatively, the information could also be routed to the EMS node of the source eNB via the EMS node of the target eNB. This could be achieved using an interface 33 for communication between different EMS nodes. In the case of LTE, the standardised peer-to-peer interface itf-P2P could be used for this purpose.

Hence, according to the embodiment described above, a radio base station comprises means for sending post-handover measurements to a handover-related parameter auto-tuning node that is not a radio base station, such as the EMS node. Such a node could also be implemented in e.g. a RNC or a RRM server. A self optimizing network (SON) server or an operation and support system (OSS) node could also comprise functionality for performing handover-related parameter auto-tuning, to further improve the handover decision process.

Referring again to FIG. 5, after the handover of a UE 10 from the source cell 30a to the target cell 30b, it might be handed over to yet another, or third, cell 30c. If such a handover takes place within a short time period, it may indicate that the first handover between cells 30a and 30b was unnecessary, and that UEs 10 in the future preferably should be handed over directly from the first cell 30a to the third cell 30c. For that reason the first radio base station 20a comprises means 208a for sending a request to the second radio base station 20b, this is illustrated by the arrow denoted 19a in FIG. 5. The first radio base station 20a thereby requests that the second radio base station 20b shall return a report in case the UE 10b is handed over from the second cell 30b to another cell, e.g. the third cell 30c, within a predefined time period after the handover of the UE 10b from the first cell 30a to the second cell 30b. The second radio base station 20b may use means 210b to receive this request. If e.g. the UE 10b should be handed over to another cell, e.g. the third cell 30c, within the predefined time period, the second radio base station 20b uses means 208b to send a report indicating that fact to the first radio base station 20a. This is indicated by the arrow denoted 19b in FIG. 5. The first radio base station 20a comprises means 209a for receiving the report from the second radio base station 20b, and may then use means 204a to adjust the handover-related parameters based on the report.

Thus, according to an exemplary embodiment of the invention, in case the radio base station in the target cell decides to perform a second handover of a UE 10 that arrived from a first cell to a third cell within a configurable time period after the first handover from the first cell to the target cell it sends a report comprising information concerning the second handover to the radio base station in the first cell.

Upon receiving information that a UE 10 has been ordered to perform handover from a first cell, via a second cell, to a third cell, the radio base station in the first cell is able to adjust handover-related parameters corresponding to the second cell accordingly, e.g. to increase the hysteresis margin and/or the time-to trigger.

Furthermore, upon receiving information that a UE 10 has been ordered to perform handover from a first cell, via a second cell, to a third cell the radio base station in the first cell is also able to adjust handover-related parameters corresponding to the third cell accordingly, e.g. to decrease the hysteresis margin and/or the time-to trigger.

The radio base stations 20a and 20b may be identical in terms of functionality. However, one of them may serve a target cell and the other may serve a source cell for a specific UE.

Figure 7:
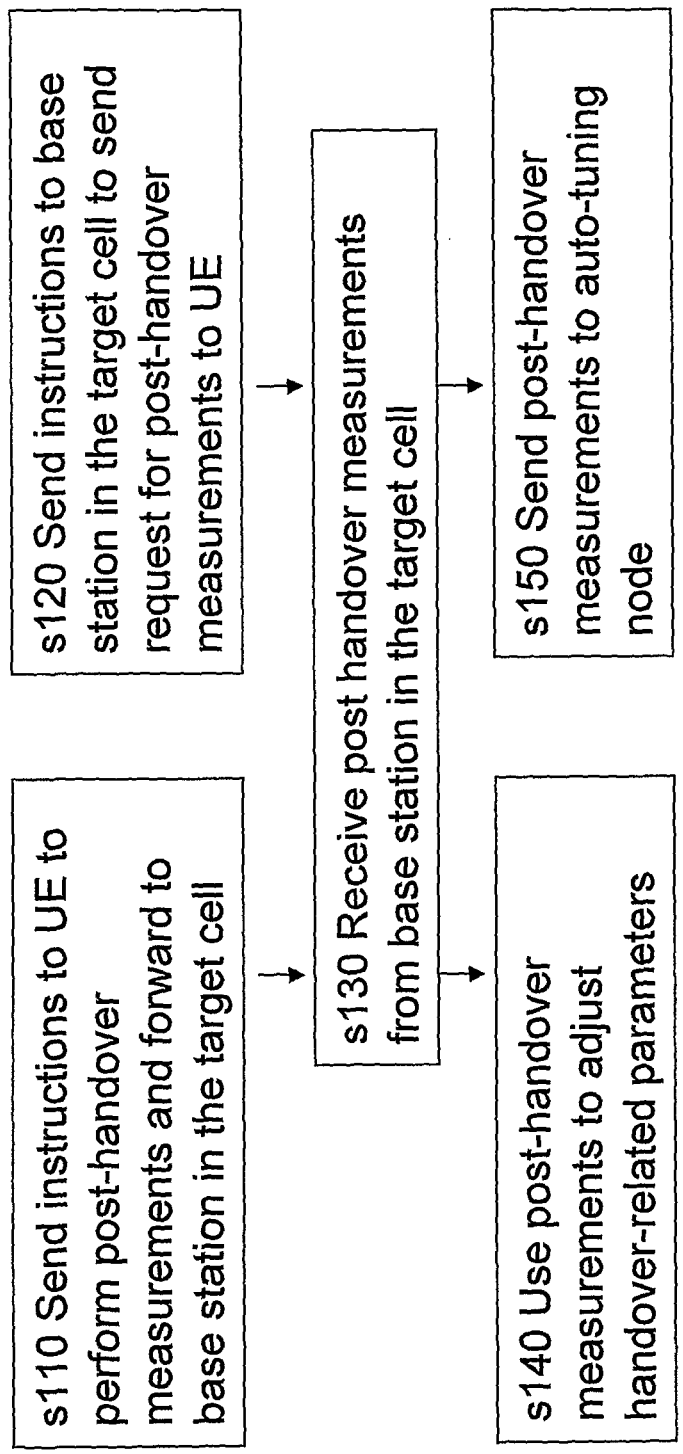
FIG. 7 illustrates method steps that are carried out in a radio base station according to an embodiment of the present invention.

FIG. 7 illustrates method steps that are carried out in a radio base station according to another embodiment of the invention. The radio base station serves a source cell and is arranged to make handover decisions based on handover-related parameters, which may comprise a handover time-to-trigger and/or a handover hysteresis margin. In step s110 the radio base station in the source cell sends instructions to a UE that is located in the source cell. The UE is thereby instructed to perform post-handover measurements after a handover from the source cell to a target cell. The radio base station in the source cell may also state a time duration, during which the post-handover measurements shall be performed. The UE is further instructed to forward the measurements to a radio base station serving the target cell. Alternatively, the radio base station serving the source cell may send instructions to the radio base station serving the target cell. This is indicated by step s120, in which the radio base station in the target cell is instructed to send a request for post-handover measurements to a UE in the target cell after handover of the UE from the source cell to the target cell. In step s130 the radio base station in the source cell receives the post-handover measurements from the radio base station serving the target cell. The radio base station in the source cell then uses the received post-handover measurements to adjust the handover-related parameters in step s140. Step s150 indicates that the radio base station also may send the received post-handover measurements to a handover-related parameter auto-tuning node that is arranged to use post-handover measurements to adjust handover-related parameters.

Figure 8:
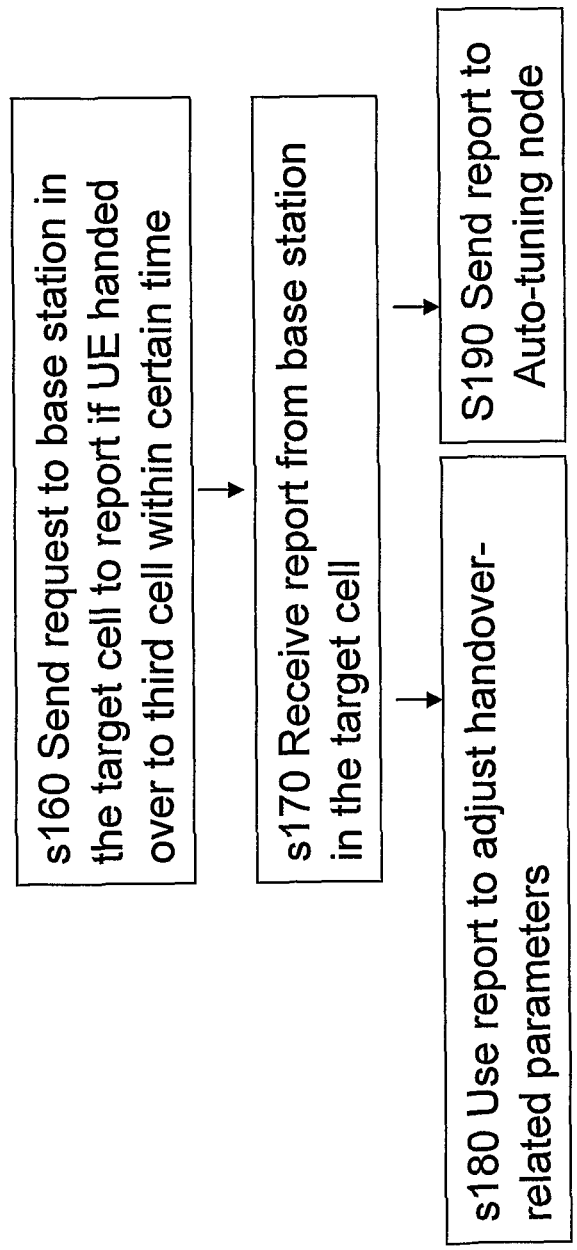
FIG. 8 illustrates method steps that are carried out in a radio base station according to another embodiment of the present invention.

FIG. 8 illustrates method steps that are carried out in a radio base station according to another embodiment of the invention. The method steps shown in FIG. 8 may be carried out by the radio base station in a source cell after handover of a UE from the source cell to a target cell. The purpose of these method steps is to inform the radio base station in the source cell in case the UE after the first handover is handed over again to a third cell within a certain time period. As mentioned above, if such a second handover is carried out shortly after the first handover, it may indicate that it is preferable to hand over UEs directly from the source cell to the third cell. Step s160 illustrates that the radio base station in the source cell sends a request to the radio base station serving the target cell. The radio base station in the target cell is thereby requested to return a report in case the UE is handed over from the target cell to a third cell within a predefined time period after the handover of the UE from the source cell to the target cell. In step s170 this report from the radio base station in the target cell is received by the radio base station in the source cell. Step s180 illustrates that the report is used by the radio base station in the source cell to adjust the handover-related parameters. Alternatively, step 190 illustrates that said report is sent to an auto-tuning node 40 for adjustment of handover-related parameters. Steps s160-s190 may be carried out independently or in connection with the method steps described with reference to FIG. 7.

Figure 9A:
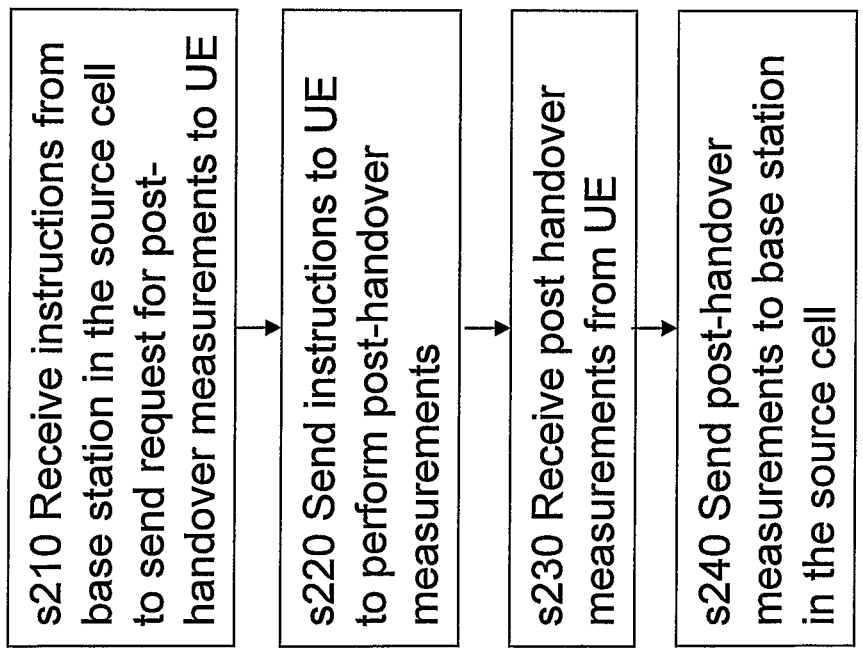
FIGS. 9a and 9b illustrates method steps that are carried out in a radio base station according to yet another embodiment of the invention.

FIG. 9a illustrates method steps that are carried out in a radio base station according to yet another embodiment of the invention. The radio base station serves a target cell. In step s210 the radio base station in the target cell receives instructions from a radio base station serving a source cell. The radio base station in the target cell is thereby instructed to send a request for post-handover measurements to a UE that has been handed over from the source cell to the target cell. In step s220 the radio base station in the target cell sends instructions to the UE to perform post-handover measurements. The radio base station in the target cell may thereby instruct the UE to perform the post-handover measurements during a certain time period. The post-handover measurements from the UE are received by the radio base station in the target cell in step s230. In step s240 the post-handover measurements are sent to the radio base station in the source cell. The radio base station in the source cell may then use the post-handover measurements to adjust handover-related parameters, which in turn are used as basis for handover decisions in the source cell. The handover-related parameters may comprise a handover time-to-trigger and/or a handover hysteresis margin.

Figure 9B:
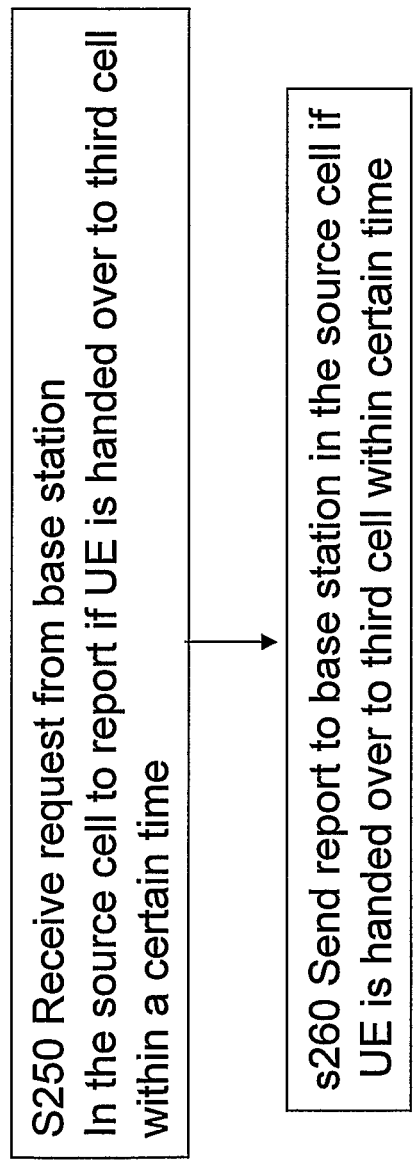

FIG. 9b illustrates method steps that are carried out in a radio base station according to yet another embodiment of the invention. The radio base station serves a target cell. In step s250 the radio base station in the target cell receives a request from the base station in the source cell to report back if the UE is handed over from the target cell to a third cell within a predefined time period after handover of the UE from the source cell to the target cell.

In step s260, the target base station sends the report to the base station in the source cell if the UE is handed over to a third cell within said certain time. The report may then be used by the radio base station in the source cell for adjusting handover-related parameters in the source cell.

Steps s250-s260 may be carried out independently or in connection with steps s210-s240

FIG. 10 schematically shows a UE 10 according to an embodiment of the invention. The UE 10 comprises standard wireless device components, such as an antenna arrangement, radio equipment, and a logic unit that can be implemented for instance as one or more microprocessors, CPUs, or similar processing or computer means, on which software may be run. The logic unit could also be implemented by hardware, such as one or more ASICs. The UE 10 also comprises a data storage unit or memory unit. The skilled person will realize that a user equipment comprises these and other components, and they will therefore not be described further in this application. The UE 10 in FIG. 10 comprises means 111 for performing post-handover measurements, means 112 for sending the post-handover measurements to a radio base station 20, and means 113 for receiving instructions to perform post-handover measurements and forward these to a radio base station 20.

For the purpose of handover-related parameter auto tuning, or auto adjusting, the source eNB may configure post-handover measurements to be performed by a UE 10 after a handover from the source cell to the target cell, and forwarded by the radio base station in the target cell back to the radio base station in the source cell via the X2 or the S1 interface.

As an illustrative example it is assumed that a UE 10 is configured to monitor RSRP1 (source), RSRP2 (target), and ΔRSRP=(RSRP2−RSRP1) during a time period T1 after the handover. These measurements may typically be marked with a specific measurement identity that the target eNB recognizes as being directed to the radio base station in the source cell. When the radio base station in the target cell receives these reports from the UE 10 they are forwarded back to the radio base station in the source cell.

In the radio base station in the source cell a successful handover may be defined as the event that ΔRSRP=(RSRP2−RSRP1) is in the range Δmin≤ΔRSRP≤Δmax during T1 seconds after the handover.

Furthermore, if ΔRSRP<Δmin while RSRP1 is above an acceptable threshold then the handover could have waited longer. When this event occurs, e.g. increase the time-to-trigger threshold ($\tau_{TTT}$) that is used in the handover decision can be increased, i.e.

$$\tau_{TTT} = \tau_{TTT} + \tau_{TTT\text{-}increase}$$

If ΔRSRP>Δmax or if RSRP1 is below an acceptable threshold then the handover is slow. When this event is observed e.g. the time-to-trigger threshold that is used in the handover decision can be decreased, i.e.

$$\tau_{TTT} = \tau_{TTT} - \tau_{TTT\text{-}decrease}$$

If the value of ΔRSRP changes sign anytime during T2 seconds after the handover then the handover hysteresis margin ($\Delta_{HOM}$) used in the handover decision can e.g. be increased, i.e.

$$\Delta_{HOM} = \Delta_{HOM} + \Delta_{HOM\text{-}increase}$$

If the value of ΔRSRP does not change sign anytime during T2 seconds after the handover then e.g. the handover hysteresis margin used in the handover decision is too large and can be decreased, i.e.

$$\Delta_{HOM} = \Delta_{HOM} - \Delta_{HOM\text{-}decrease}$$

Thus, after a handover is performed the target eNodeB continues to send post-handover measurements obtained by the UE 10 back to the source eNodeB. The source eNodeB uses this information to adjust handover related parameters used in the handover decision process.

In particular the difference between the signal strength of the source cell and the target cell is according to an exemplary embodiment obtained as post-handover measurement after the handover is performed (ΔRSRP=RSRP(target)−RSRP(source), where RSRP denotes a reference symbol received power measurement performed by the UE 10).

In case the radio base station in the source cell receives information that the signal strength difference value (ΔRSRP) has changed sign during a configurable time period after the handover, it may increase a hysteresis margin used for the corresponding target cell. If said difference value has not changed sign during said time interval the corresponding hysteresis margin may be reduced.

In case the radio base station in the source cell receives information that the signal strength difference value (ΔRSRP) has been positive and smaller that a threshold (Δmin) during a configurable time period after the handover, the time-to-trigger threshold used for the corresponding target cell may be increased. If said difference value has been positive and larger than a threshold (Δmax) during said time interval the corresponding time-to-trigger threshold may be reduced.

Signal quality and/or UE transmitted power may be measured in combination with or as alternatives to RSRP. In LTE, reference signal received quality (RSRQ) is a UE received quality measurement that may be used. These and other measurements that will be realized by the skilled person may be used as post-handover measurements individually or in combination. Also, various measurement relations, such as differences between measurements, may be used as post-handover measurements.

As described above, it may also be possible for the source eNB to configure the target eNB to report back to the source eNB if a UE 10 is ordered to perform a new handover to a third cell within a predefined time period after the first handover from the source to the target. When receiving information about this event the source eNB can decide to increase the corresponding handover hysteresis margin to the first target cell and decrease the corresponding handover hysteresis margin to the new third cell. By doing this the source eNB increases the probabilities that UEs 10 (possibly belonging to a certain handover classification group) are directly forwarded to the third cell and does not have to go via the second cell. FIG. 11 illustrates an example scenario in which a UE 10 travels along a road. First, the UE 10 is handed over from cell 1 to cell 2. Within a short time period the UE 10 is then handed over from cell 2 to cell 3. The radio base station in cell 2 informs the radio base station in cell 1 about the fast handover to cell 3. This is denoted by arrow A2. The radio base station in cell uses this information to auto-tune parameters used in handover decisions. After handover parameter auto-tuning the radio base station in cell 1 may decide to perform future handovers directly to cell 3.

It should be noted that several radio base stations may be connected to form a system in which the principles of the invention apply.

Also, radio base stations and user equipments according to the invention may be part of a system that functions in accordance with the principles of the present invention.

Thus, specific embodiments of the invention makes it possible to achieve handover parameter auto-tuning based on radio signal measurements in e.g. an LTE system also in a multi-vendor scenario.

The skilled person will, based on the examples described above, realize that other parameter configurations and combinations also may be used within the principles of the invention. For instance, a hysteresis margin and a time-to-trigger may be adjusted separately or in combination in order to achieve a certain result depending on the desired handover decision scheme.

The above described embodiments of the invention are intended to be examples only. Alterations, modifications, and variations may be effected to particular embodiments by those skilled in the art without departing from the scope of the invention, which is defined by the accompanying claims.

Among others the following abbreviations have been used in the above description:
3GPP 3rd Generation Partnership Project
ASIC Application Specific Integrated Circuit
BSC Base Station Controller
CPU Central Processing Unit
EMS Element Management System
eNB E-UTRAN NodeB
E-UTRAN Evolved UTRAN
GSM Global System for Mobile communications
HO Handover
ITF-P2P Interface Peer-to-Peer
LTE Long Term Evolution
MAHO Mobile Assisted Handover
MCHO Mobile Controlled Handover
MME Mobility Management Entity
NCHO Network Controlled Handover
OSS Operation and Support System
RNC Radio Network Controller
RRC Radio Resource Control
RRM Radio Resource Management
RSM Radio Signal Measurement
RSRP Reference Symbol Received Power
RSRQ Reference Signal Received Quality
SAE System Architecture Evolution
SON Self Optimizing Network
S-GW SAE Gateway
TTT Time-to-trigger
UE User Equipment
UMTS Universal Mobile Telecommunication System
UTRAN UMTS Terrestrial Radio Access Network
WCDMA Wideband Code Division Multiple Access

The invention claimed is:
1. A radio base station of a mobile communications network, the radio base station arranged to serve at least a first cell, and to make handover decisions based on handover-related parameters, said radio base station comprising one or more processing circuits configured to:
receive handover related feedback from a radio base station serving a second cell after handover of a UE from said first cell to said second cell; and use the handover related feedback received from the base station serving said second cell to adjust the handover-related parameters.

2. The radio base station according to claim 1, wherein said handover related feedback comprises post-handover measurements performed by a UE after handover from said first cell to said second cell or from said second or another cell to the first cell, whereby the radio base station is further configured to:
receive post-handover measurements from a UE in said first cell, said measurements performed by the UE after handover to said first cell from a second or another cell; and
send said post-handover measurements to a radio base station serving said second or another cell.

3. The radio base station according to claim 2, wherein the radio base station is configured to instruct a UE in said first cell to perform post-handover measurements after handover from said first cell to said second cell and to forward said measurements to a radio base station serving said second cell.

4. The radio base station according to claim 3, wherein the radio base station is configured to instruct said UE to perform post-handover measurements during a configurable time period after handover from said first cell to the second cell.

5. The radio base station according to claim 2, wherein said post-handover measurements comprise a measurement of received signal power.

6. The radio base station according to claim 1, wherein the radio base station is configured to send, to a radio base station serving said second cell, a request to send handover related feedback after handover of a UE from said first cell to said second cell.

7. The radio base station according to claim 6, wherein said request comprises instructions to send a request for post-handover measurements to a UE in said second cell after a handover of the UE from said first cell to said second cell.

8. The radio base station according to claim 1, wherein the radio base station is configured to send the handover related feedback received from the base station serving said second cell to a handover-related parameter auto-tuning node arranged to use said handover related feedback to adjust handover-related parameters.

9. The radio base station according to claim 1, wherein the handover-related parameters comprise a handover time-to-trigger.

10. The radio base station according to claim 1, wherein the handover-related parameters comprise a handover hysteresis margin.

11. The radio base station according to claim 1, wherein the radio base station is configured to send a request to a radio base station serving a second cell to return a report in case a UE is handed over from said second cell to a third cell within a predefined time period after a handover of the UE from said first cell to said second cell.

12. A method in a radio base station of handling handover-related parameters in a mobile communications network, the radio base station serving a first cell and arranged to make handover decisions based on handover-related parameters, the method comprising: receiving handover-related feedback from a radio base station serving a second cell after handover of a UE from the first cell to the second cell; and using said received handover-related feedback to adjust the handover-related parameters.

13. The method according to claim 12, wherein said handover-related feedback comprises post-handover measurements, said measurements performed by a UE in said second cell after handover from said first cell to said second cell.

14. The method according to claim 13, further comprising instructing a user equipment (UE) in the first cell to perform post-handover measurements after handover from the first cell to the second cell and to forward said measurements to a radio base station serving the second cell.

15. The method according to claim 14, wherein the UE is instructed to perform post-handover measurements during a configurable time period after handover from said first cell to the second after cell.

16. The method according to claim 13, wherein said post-handover measurements comprise measurements of received signal power.

17. The method according to claim 12, further comprising sending, to a radio base station serving the second cell, a request to send handover related feedback after handover of a user equipment (UE) from said first cell to said second cell.

18. The method according to claim 17, wherein said request comprises instructions to send a request for post-handover measurements to a UE in said second cell after a handover of the UE from said first cell to said second cell.

19. The method according to claim 12, further comprising sending the handover-related feedback received from the base station serving the second cell to a handover-related parameter auto-tuning node arranged to use handover-related feedback to adjust handover-related parameters.

20. The method according to claim 12, wherein the handover-related parameters comprise a handover time-to-trigger.

21. The method according to claim 12, wherein the handover-related parameters comprise a handover hysteresis margin.

22. The method according to claim 12, further comprising sending a request to a radio base station serving a second cell to return a report in case a user equipment (UE) is handed over from said second cell to a third cell within a predefined time period after a handover of the UE from said first cell to said second cell.

23. A method in a radio base station of handling handover-related parameters in a mobile communications network, the radio base station serving a second cell, the method comprising:
sending handover-related feedback to a radio base station serving a first cell after handover of a user equipment (UE) from the first cell to said second cell for adjustment of handover-related parameters used as basis for handover decisions in said first cell.

24. The method according to claim 23, wherein said handover-related feedback comprises post-handover measurements, said method further comprising:
receiving post-handover measurements from a UE, said post-handover measurements performed by the UE after handover from a first cell to said second cell; and
sending said post-handover measurements to a radio base station serving said first cell for adjustment of handover-related parameters used as basis for handover decisions in said first cell.

25. The method according to claim 24, wherein said post-handover measurements comprise measurements of received signal power.

26. The method according to claim 23, further comprising receiving, from a radio base station serving the first cell, a request to send handover related feedback after handover of a UE from said first cell to said second cell.

27. The method according to claim 26, wherein said request comprises instructions to send a request for post-handover measurements to a UE in said second cell, said method further comprising sending, to the UE in the second cell, instructions to perform post-handover measurements after handover from the first cell to the second cell.

28. The method according to claim 27, wherein the instructions to the UE to perform post-handover measurements are sent during a configurable time period.

29. The method according to claim 23, wherein the handover-related parameters comprise a handover time-to-trigger.

30. The method according to claim 23, wherein the handover-related parameters comprise a handover hysteresis margin.

31. The method according to claim 23, further comprising sending, to a radio base station serving the first cell, a report in case a UE is handed over from said second cell to a third cell within a predefined time period after a handover of the UE from said first cell to said second cell, said report used as basis for adjustment of the handover-related parameters in said first cell.

32. A user equipment (UE) arranged to communicate with a radio base station serving a second cell, said UE including one or more processing circuits configured to:
   perform post-handover measurements after handover from a first cell to the second cell; and
   send said post-handover measurements to the radio base station serving said second cell, to be forwarded to a radio base station serving said first cell for adjustment of handover-related parameters to be used as basis for handover decision in said first cell.

33. The UE according to claim 32, wherein the UE is configured to receive, from the radio base station serving said second cell, instructions to perform post-handover measurements.

34. The UE according to claim 32, wherein the UE is configured to perform said post-handover measurements during a configurable time period.

35. The UE according to claim 32, wherein said post-handover measurements comprise measurements of the received signal power.

* * * * *